United States Patent [19]

MacDonald et al.

[11] 4,399,555
[45] Aug. 16, 1983

[54] CELLULAR HIGH CAPACITY MOBILE RADIOTELEPHONE SYSTEM WITH FLEET-CALLING ARRANGEMENT FOR DISPATCH SERVICE

[75] Inventors: Verne H. MacDonald, Elberon; Philip T. Porter, Colts Neck; W. Rae Young, Middletown, all of N.J.

[73] Assignee: Bell Telephone Laboratories, Incorporated, Murray Hill, N.J.

[21] Appl. No.: 144,609

[22] Filed: Apr. 28, 1980

[51] Int. Cl.³ .................. H04B 7/00; H04M 7/00; H04Q 7/04
[52] U.S. Cl. ............................ 455/33; 455/56; 179/2 EB; 179/2 EC; 179/41 A
[58] Field of Search .................. 455/31, 32, 33, 53, 455/54, 56, 57, 58; 179/2 EA, 2 EB, 2 EC, 41 R, 41 A, 42, 43

[56] References Cited

U.S. PATENT DOCUMENTS

| | | |
|---|---|---|
| 2,685,642 | 8/1954 | Vallarino et al. |
| 2,894,074 | 7/1959 | Elliott |
| 3,370,127 | 2/1968 | Courtney |
| 3,519,744 | 7/1970 | Dorros |
| 3,663,762 | 5/1972 | Joel, Jr. .................. 455/33 |
| 3,692,952 | 9/1972 | Leonard |
| 3,786,199 | 1/1974 | Rimbach, Jr. |
| 3,819,872 | 6/1974 | Hamrick .................. 455/33 |
| 4,012,597 | 3/1977 | Lynk, Jr. |
| 4,092,600 | 5/1978 | Zimmerman |
| 4,131,849 | 12/1978 | Freeburg |
| 4,144,496 | 3/1979 | Cunningham .................. 455/54 |

OTHER PUBLICATIONS

High-Capacity Mobile Telephone System Technical Report, Bell Lab., Dec. 1971, pp. 1-4 to 1-7 and 3-42 to 3-48.
Trunking a New System Configuration for Fleet Dispath Communications, By S. Thro., 29th IEEE Vehicular Technology Conference Record, Mar. 27-30, 1979, pp. 302-306.
A Dynamic Space Division Multiplex Mobile Radio System, By H. Staras, IEEE Transactions on Vehicular Technology, vol. VT-19, No. 2, May 1970, pp. 206-213.
Mobile Telephone Switching Office, By K. Chadha, et al., The Bell System Technical Journal, vol. 58, No. 1, Jan. 1979.
A Multiport Telephone Conference Bridge, By William Kuebler, IEEE Transactions on Communications Technology, vol. COM-16, No. 1, Feb. 1968.

*Primary Examiner*—Tommy P. Chin
*Attorney, Agent, or Firm*—C. S. Phelan

[57] ABSTRACT

A high capacity, cellular, channel reuse, mobile, radiotelephone system supplies both nondispatch radiotelephone service and dispatch service with a fleet-calling capability. For the latter capability, unidirectional communication (48) is provided from a dispatcher station (39) to a fleet-listen radio channel ($f_{FC10}$, $f_{FC20}$) in each service region of the system where idle fleet mobile units are located. Bidirectional communication (46) is provided between one or more responding fleet units and a fleet dispatcher, and such communication is also applied to the fleet-listen channels.

11 Claims, 5 Drawing Figures

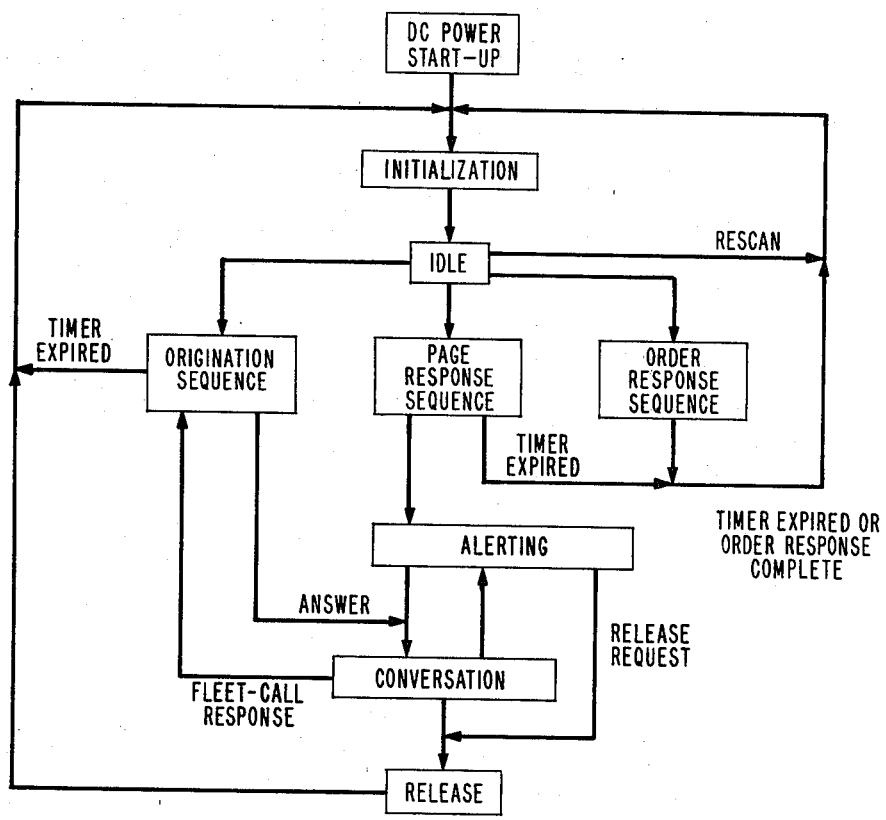

CELLULAR HIGH CAPACITY MOBILE RADIOTELEPHONE SYSTEM WITH FLEET-CALLING ARRANGEMENT FOR DISPATCH SERVICE

BACKGROUND OF THE INVENTION

This invention relates to a high capacity, channel reuse, mobile, radiotelephone system providing both conventional subscriber radiotelephone service and dispatch type radiotelephone service.

Prior radiotelephone systems usually allot a separate duplex channel frequency pair per mobile party in each mobile service area (typically a city) for conventional radiotelephone subscriber messages. Thus, such a frequency pair was required for each individual mobile unit in a given area involved in a conference call. Similarly, in current high capacity cellular radiotelephone systems, a separate channel is required for each mobile unit involved either in an individual call or in a conference call, but that is a less significant penalty in the cellular channel reuse types of systems than in other radiotelephone systems because of the spectrally efficient nature of the cellular plan.

In a dispatch system, a message may need to be sent either in a single mobile unit or to a group of mobile units of a fleet; and in the latter case, the group may have different sizes at different times. The mobile units of a group in a fleet of units, such as the units in a taxi service, a sales force, or a utility service crew, may also be scattered in widely separated geographical locations. The present invention is primarily concerned with dispatch service of the latter type in which a fleet call can be made to multiple units and, in particular, with a system providing such service which is also able to provide the conventional, nondispatch, radiotelephone service.

One common type of radio dispatch system utilizes a single channel for a given fleet group, and mobile units listen to all messages broadcast to the fleet. One mobile unit user wishing to respond uses a push-to-talk (PTT) switch to activate the unit transmitter on the same channel. However, that dispatch channel is unavailable to other users either for dispatch service or for any other purposes throughout the entire mobile service area.

In an A. R. Vallarino et al. U.S. Pat. No. 2,685,642, a cellular type of dispatching arrangement is depicted in which adjacent cells utilize different frequency channels of a limited channel set, but it is possible to reuse channel sets in different nonadjacent parts of the same service area. In this case, a mobile unit user must be familiar with the boundaries of the different cells and advise the fleet dispatcher when such user is crossing into a new cell. Neither nondispatch nor fleet-call operations are considered.

The mixed traffic mobile radiotelephone system of the A. Rimbach, Jr., U.S. Pat. No. 3,786,199 contemplates combined telephone and dispatch service in the same frequency channel environment. However, this patent deals with the situation wherein a dispatcher needs to address a single unit of a fleet and does not deal with the fleet-call situation wherein a dispatcher needs to address multiple mobile unit users in a single call.

Otherwise, in cellular, high capacity, channel reuse systems, it has usually been considered that each listening and responding unit of a fleet must have its own duplex channel assignment during a dispatcher's fleet call. This type of arrangement thus requires a different duplex channel per mobile unit within any given cluster of cells of the system. That tends to require many channels during a fleet call. It is also a fact that conference bridging arrangements are required to enable the dispatcher and the fleet to listen to all calls, and the cost of such conferencing equipment puts a limit on the size of any fleet which can be economically interconnected at any one time. Conferencing was used because it has been found in fleet dispatching practice that it is sometimes desirable to let all or a substantial part of a fleet listen to fleet calls and all responses. For example, this enables the users of different units in the fleet to gauge their respective proximities to the point to which a dispatch is being made and decide, after a first responding unit has called in, whether or not one of them also should offer to participate.

One basic, mobile, radiotelephone, cellular, channel reuse system of the type indicated is described in the *Bell System Technical Journal*, Jan., 1979, Vol. 58, No. 1. Dispatch service considerations for such a system may be found in the "High Capacity Mobile Telephone System Technical Report" prepared by Bell Laboratories and filed Dec. 20, 1971 with the Federal Communications Commission in docket 18262. See, for example, pages 1-4 through 1-7 and 3-42 through 3-48 of that report.

SUMMARY OF THE INVENTION

In an illustrative embodiment of the present invention, the aforementioned fleet calling problems in cellular channel reuse systems are alleviated by coupling a fleet dispatcher station through a switch office to different parts of the fleet in different ways. The office includes two input/output ports coupled together for bidirectional communication of signals, and in addition, those signals are coupled through a fan-out node to plural output ports of the office.

In terms of a fleet-calling embodiment, the dispatcher is coupled to the fleet for unidirectional communication to the mobile units thereof by way of a fleet-listen channel in each service region served by a fixed station antenna and in which region fleet mobile units are active. Such a fleet-listen channel is used in common by all fleet mobile units in such region. These fleet-listen channels are engaged only during a fleet-call message and can be utilized by regular nondispatch radiotelephone service at other times. The dispatcher is bidirectionally coupled with responding mobile unit users who desire bidirectional communication, and a still further coupling is provided from the bidirectional coupling to the unidirectional coupling so that the listen-only portion of the fleet is able to listen to both sides of the bidirectional communication with one or more responding units.

BRIEF DESCRIPTION OF THE DRAWING

A more complete understanding of the invention and its various features, objects, and advantages may be obtained from a consideration of the following detailed description in connection with the appended claims and the attached drawing in which

FIG. 5 is a process flow diagram, with fleet call facility, for the mobile station of FIG. 4.

DETAILED DESCRIPTION

Figure 1:
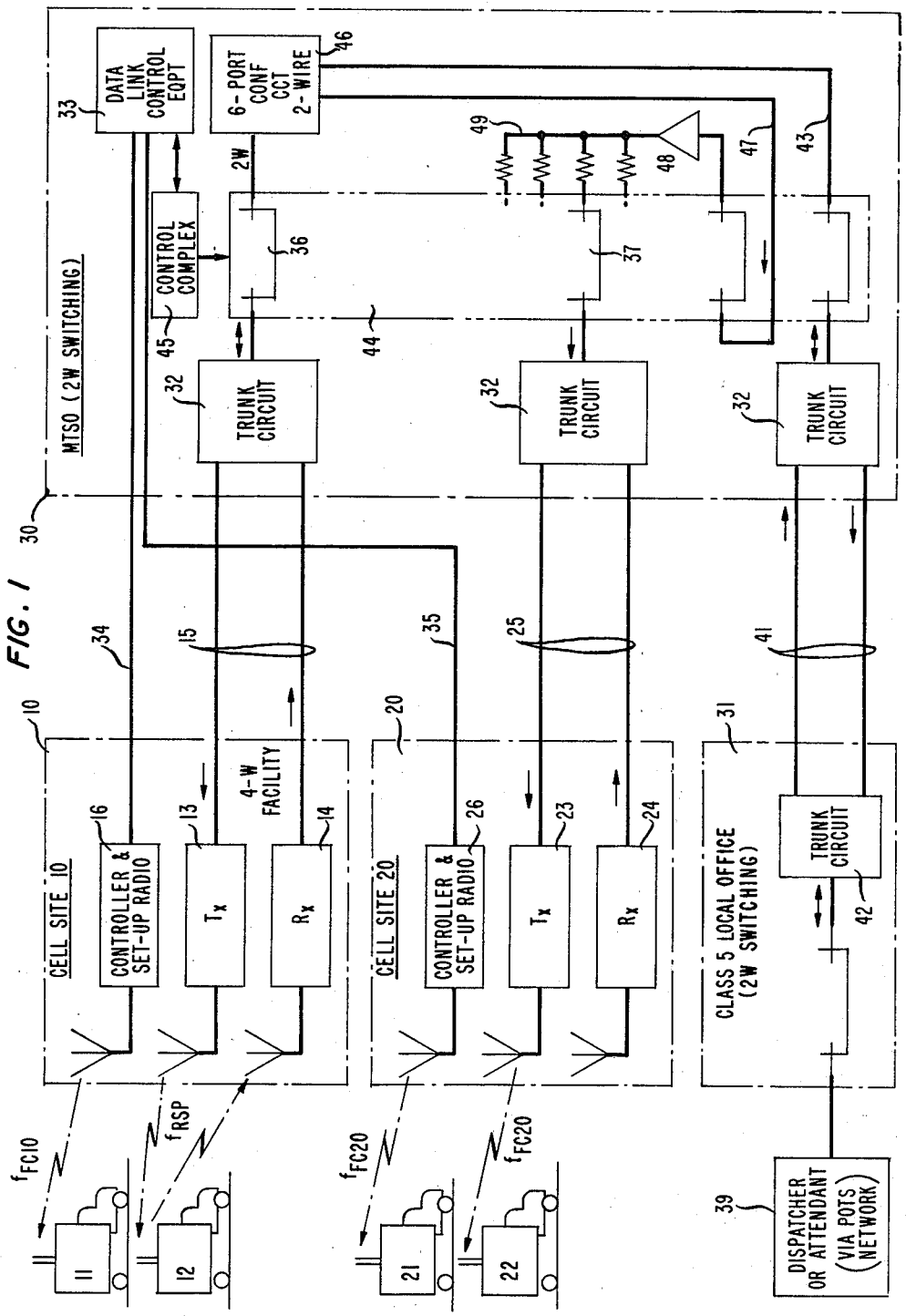
FIG. 1 is a block and line diagram of a cellular radiotelephone system utilizing the present invention.
Figure 2:
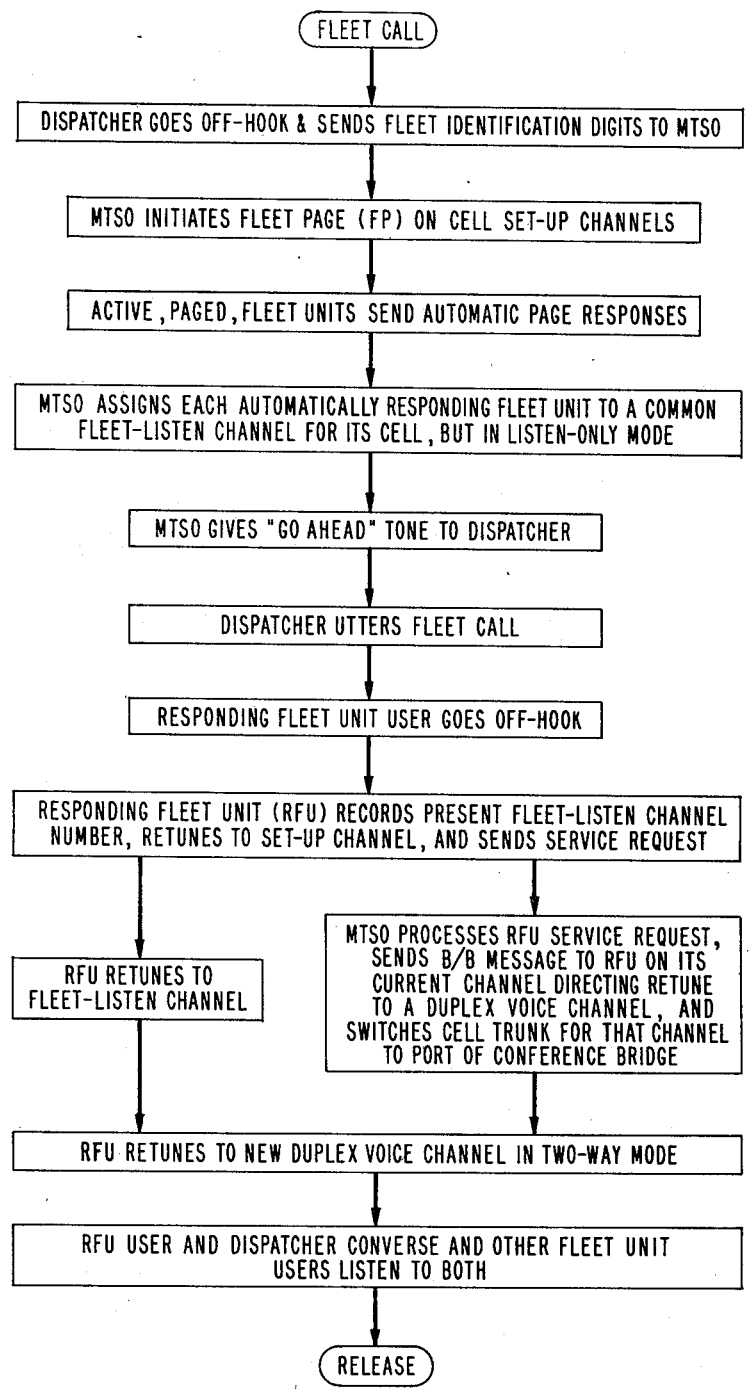
FIG. 2 is a process flow diagram for serving a fleet call in the system of FIG. 1.

The FIG. 1 system is considered in conjunction with the process diagram of FIG. 2. In FIG. 1, two cell sites 10 and 20, sometimes called base stations, of a cellular, channel reuse, mobile, radiotelephone system of the type described in the aforementioned *Bell System Technical Journal* (BSTJ), are coupled to a mobile telephone switching office (MTSO) 30. These elements correspond, for example, to those shown in FIG. 1 on page 11 and FIG. 2 on page 74 of that BSTJ issue. In the literature, a seeming distinction has often been made between center-excited cells and corner-excited cells. A center-excited cell is described as having an omnidirectional antenna site located approximately at its center, whereas a corner-excited cell is described as having three directional antenna sites placed at alternate vertices. In fact, any cellular system can be appropriately viewed in terms of center-excited cells, regardless of the directional characteristics of the cell-site antennas. Therefore, the present invention is herein described primarily in reference to the center-excited form.

A class 5 local switching office 31 is also connected to the MTSO 30. Both the MTSO 30 and the office 31 provide two-wire circuit switching functions. At each cell site, multiple radiotelephone channels are available to provide radio links for serving mobile units of the system such as the mobile units 11 and 12 adjacent to cell site 10, and mobile units 21 and 22 adjacent to cell site 20. Each such channel is equipped with a transmitter and a receiver with associated antennas, and which are connected by the respective two-wire transmission paths of a four-wire facility to a suitable trunk circuit 32 in the MTSO. Only one such voice channel transmitter-receiver combination and associated four-wire facility are shown for each cell site in order to avoid undue complication of the drawing. Thus, a transmitter 13 and a receiver 14 in cell site 10 are coupled to the MTSO 30 by way of a four-wire facility 15 such as, for example, T-carrier and D-channel bank facilities. Similarly, a transmitter 23 and receiver 24 in cell site 20 are coupled to the MTSO by way of a four-wire facility 25.

Data communication between MTSO 30 and the mobile units served by the respective cell sites is provided by way of data link control equipment 33 in the MTSO, and wire data links 34 and 35 to respective controllers and set-up radios 16 and 26 in the two illustrated cell sites. The controller and set-up radios provide a set-up channel radio link to all mobile units in the respective cells as is described in the aforementioned issue of the BSTJ. Briefly, however, a working mobile unit tunes itself to the set-up channel of a cell site in the region in which the mobile unit happens to be located in order to listen for paging messages directed to it from the data link control equipment 33. A mobile unit detecting its unit number in a paging message automatically sends back a response message on a set-up channel; and, upon receipt of the response in equipment 33, the MTSC provides a further message directing the mobile unit to retune itself to a designated duplex channel used by the cell in whch the unit is located. After that retuning has been completed, the system process then proceeds to alert the mobile unit user in preparation for the establishment by the MTSO of a call connection through the MTSO switching network 44. Similarly, a mobile unit originated call is initiated by the unit user, e.g., going off-hook and thereby causing the unit automatically to transmit a call request data signal on a set-up channel to the MTSO. In this case also, the MTSO 30 responds by directing the mobile unit automatically to retune to a designated duplex channel in order to proceed with other operations in the setting up of a normal two-party call. The processes for setting up ordinary radiotelephone, mobile-originated calls and mobile-terminated calls in the regular cellular system, as well as supervision of calls in progress, are discussed in greater detail in the aforementioned BSTJ issue at, or example, pages 47–55, 61–68, and 77–83. Those processes involve data communication; and the major subsystems of a system, including a data frame for that purpose, and a data frame block diagram are shown on pages 154 and 158 of that issue. Page 138 in that issue includes a diagram of a mobile logic unit which is also involved in such data communication.

In the MTSO 30, the trunk circuits 32 perform the typical two-wire/four-wire conversion in typical telephone fashion using hybrid circuits of either the transformer type or the resistive type; and in the switching portion of the MTSO, the two-wire circuits are interconnected as required to connect cell site trunks to one another or to the fixed telephone network schematically represented by the office 31. Switched connections in FIG. 1 are schematically represented by a rectangular U-shaped interconnection, such as the connections 36 and 37 for the facilities 15 and 25 extending to cell sites 10 and 20. Only trunk circuits for the illustrated trunks are shown.

One telephone network subscriber having access to the network by way of the class 5 office 31 is a mobile unit fleet dispatching station 39 which often requires communication with many mobile units of all, or a significant part of, the total fleet of units with which the dispatcher is associated. Any of the units may be in or near to any of the cells covering the total geographical area in the dispatcher's region of interest. That region may encompass all or part of the total cellular mobile service area in a given urban area.

In order to initiate a fleet call, the dispatcher dials, or otherwise initiates transmission of, one or more codes to call the entire fleet or some predetermined part, or group, of the fleet. Such code results in access to the MTSO through the office 31 and a trunk transmission facility 41. The local office coupling and supervision function is accomplished by a trunk circuit 42 which interfaces with the trunk facility 41.

In MTSO 30, a trunk circuit 32 converts the signal path back to the two-wire format. A switchable circuit 43 is provided to one two-wire input/output connection port of a bidirectional communication conference circuit or bridge 46. That circuit is advantageously a six-port circuit of a type now well known in the art for allowing three or more circuits to be interconnected for communication in a way which allows signals applied at any port of the circuit to result in corresponding outgoing signals at all other ports of the circuit. One example of such a bridge is shown in "A Multiport Telephone Conference Bridge" by W. P. Kuebler, appearing at pages 168–172 of *IEEE Transactions on Communications*, vol. COM 16, February, 1968.

An additional port of the six-port circuit 46 is coupled by way of another switchable circuit 47 to the input of an amplifier 48 connected in tandem for current amplification between that connection and a signal fan-out node 49. Separate branch circuits, each including an isolating resistor, are coupled from the node 49 through respective switch connections, such as the connection 37, to facilities providing communication to each cell in the dispatcher's area of interest. Each such communication path is similar to the one illustrated for the connection 37 and the cell site 20. One such connection is also provided from the node 49 to the cell site 10, although it is not specifically shown in the drawing. Only one such coupling is necessary from the node 49 to a transmitter of each service region involved in a fleet call, regardless of the number of mobile units of the fleet which may be in that region at the time of any particular call. Each such coupling provides signals to a channel transmitter for a fleet-listen channel in the cell. In FIG. 1, that channel at cell site 10 is designated $f_{FC10}$, and at cell site 20, is designated $f_{FC20}$.

When the illustrated facilities are utilized for a fleet call as herein described, the cell site receiver for the channel utilized in a fleet call at each cell, such as receiver 24 in cell 20, is not used. In the illustrative embodiment, that is partly because of the unidirectional characteristics of the communication path through amplifier 48, and partly because the fleet mobile units are so controlled that their transmitters are disabled when they are tuned to the fleet-listening channel of a cell.

In response to the dispatcher initiation of a call to all or part of the fleet, as indicated in FIG. 2, the MTSO pages the fleet by way of a fleet page message FP on the set-up channels of the various cells. This message advantageously comprises a separate set-up channel data message addressed to each mobile unit of the fleet and transmitted in sequence to all units. It is, of course, also possible to transmit a common recognizable single fleet code; but the use of discrete addresses is adequately fast in most cases, e.g., about one second to address a fleet of 20 units. The described fleet call connections are advantageously set up in the MTSO each time that a fleet call is made, and when not so in use, they are generally available for nondispatch radiotelephone service or for use by other fleets.

All working mobile units of the fleet receiving the fleet page on the set-up channels of their respective cells respond automatically and in the usual manner for mobile units in the cellular, channel reuse type of system. The MTSO 30 detects respective answers to the fleet page and assigns each responding unit to the fleet-listen channel, i.e., $f_{FC10}$ or $f_{FC20}$ in FIG. 1, in its cell (the largest cell in which the unit is located if its location happens to be served by cells of more than one size) in the listen-only mode. The listen-only mode means that the channel retuning command instructs the mobile unit to maintain its transmitter in a disabled state, even after retuning. Each fleet mobile unit then records its respective set-up channel identification, retunes its receiver to the assigned fleet-listen channel, and generates a unique audible alerting signal to inform the user that a fleet call is about to come in. The user can listen either to a loudspeaker or to a handset receiver; but his response to the alerting is not transmitted to the MTSO.

After an appropriate interval following transmission of the fleet page message, e.g., four seconds, the MTSO transmits a "go ahead" tone to the dispatching station attendant. That dispatcher then utters the intended fleet-call message which is transmitted by way of the FIG. 1 bidirectional circuit 43 to the conference circuit 46 and, from there, by way of the unidirectional connection including amplifier 48 and the node 49 to the respective calls.

When a mobile unit user wishes to respond to a fleet-call message, the user initiates an off-hook calling procedure. Alternatively, if the mobile unit is already off-hook, the user initiates the procedure by a switch hook flash. In FIG. 2, this off-hook signal from the mobile unit user advantageously causes the unit to record its present channel tuning designation and then revert to a set-up channel, the number of which was previously stored. After retuning, the unit automatically seizes the reverse direction for that duplex channel in the usual way for cellular, channel reuse systems as described in the aforementioned BSTJ issue. A data-type service request message is sent by the unit requesting a channel connection to make a call. The system recognizes that the mobile unit is a fleet unit and automatically, without the need for the mobile unit user to dial a number, arranges a regular duplex radiotelephone channel, e.g., a channel $f_{RSP}$ in FIG. 1 utilizing transmitter 13 and receiver 14 in cell site 10, connection to a port of the six-port conference circuit 46. Having sent the service request message, the mobile unit then automatically, and without waiting for an MTSO channel-assignment response, retunes itself to the listen-only mode on the previously recorded fleet-listen channel. Alternatively, the process can be arranged to omit that last retuning step; but its use is advantageous if in a particular application there may be a significant delay in the MTSO response and during which time the mobile unit user could miss some significant transmission on the fleet-listen channel.

Meanwhile, the MTSO processes the channel, or service, request message received from that mobile unit 12, selects an available channel in the serving cell 10, and sends a blank-and-burst message to the mobile unit on the fleet-listen channel $f_{FC10}$ as in a normal mobile unit hand-off operation described in the *Bell System Technical Journal,* and which directs the mobile unit to retune now to a new voice duplex channel. The MTSO also switches the cell trunk for that latter channel to a port of the conference circuit 46. The blank-and-burst data message is a high-speed data message at a bit rate much higher than the Nyquist rate for a voice signal. This message may be heard as only a click for a normal mobile unit user; but for the mobile unit itself, the message contains sufficient information to enable the described retuning. Consequently, the responding fleet mobile unit now retunes to its newly assigned duplex channel and generates an audible alerting signal to inform the user that the connection is complete. The mobile unit user and dispatching station attendant now converse in a two-way mode while the rest of the active fleet listens to them both by way of the coupling from bridge 46 through amplifier 48.

The foregoing arrangement allows the dispatching station 39 to transmit messages to all mobile units of the fleet by the process of FIG. 2 by way of the cell site transmitter on the fleet-listen channel of each cell. However, because the connections in the MTSO 30 are all switchable, that channel is also otherwise generally useful for ordinary, nondispatch, telephone service when a fleet call is not in progress. Similarly, of course, any available voice channel to a cell site can be utilized for the described fleet calling arrangement.

If no fleet call is in progress at any given time, none of the illustrated MTSO switchable couplings is engaged. Then a fleet mobile unit user wishing to contact the dispatcher proceeds as before, i.e., as when responding to a fleet call, to initiate the off-hook calling procedure. Now, however, the system recognizes that the received data message on the cell set-up channel is from a fleet unit, and further recognizes that the fleet dispatching station 39 is not connected to the conference bridge 46. The system then initiates its regular process for a nondispatch mobile-originated call; but in this case, it automatically connects the dispatching station 39 to conference circuit 46, along with the connection 36 from facility 15 to the same conference circuit, when the dispatcher goes to the off-hook state.

If a mobile unit user wishes to communicate with the fleet or with another unit of the fleet when a fleet call is not in progress, that user initiates a call to the dispatcher as just described, and requests the dispatcher to set up a limited-group fleet call including only the appropriate mobile units. Assuming a call to a single additional unit, the user of the second unit, upon hearing the fleet-call message, initiates the off-hook calling procedure to obtain a duplex connection to the conference circuit 46 and carry on a two-way conversation with the operator of the first mobile unit in the hearing of the dispatcher.

Alternatively, of course, the controlling software for the MTSO 30 and a fleet unit can be structured to allow a fleet mobile unit to initiate a call either to the dispatcher or to a station either inside or outside of the dispatching fleet in the same way. To do this, the fleet unit operator dials an appropriate calling code in either case; and the system treats the incoming data message in the same fashion as an incoming message from another mobile unit that is not in the fleet once it is recognized that no fleet call is in progress. Then the call set-up process continues in the ordinary cellular system fashion already outlined, except that when the dispatcher is called, the fleet unit and dispatcher are connected through the bridge 46. It is apparent from the foregoing that a fleet mobile unit can exercise the control station functions hereinbefore described for making fleet calls by simply dialing the same or similar dial codes. In such a situation, the unit initiates a nondispatch call and is assigned to a duplex channel that is then coupled to the conference circuit 46 and amplifier 48 for the fleet call instead of, or in addition to the connection of station 39 to those elements. Similarly, the dispatcher, or any user knowing the fleet-access dial codes, can initiate fleet calls from any station in the overall telephone network of which the FIG. 1 system is a part.

If in a particular application it is desirable to conference more parties than are allowed by the circuit 46, additional multiport modules can be added as described in the aforementioned Kuebler paper. Alternatively, the MTSO process can be arranged to detect when all circuit 46 ports are occupied and thereafter queue additional responding service requests, order retuning to the fleet-listen channel by any fleet unit that has been on circuit 46 for at least a predetermined interval, e.g., 90 seconds, and replace each retuned unit with a queued unit.

Figure 3:
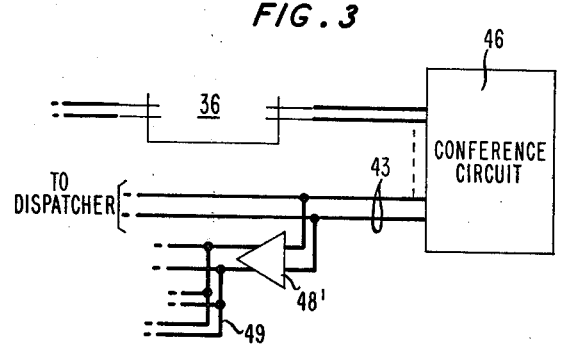
FIG. 3 is a block and line diagram of a modification of a portion of the system in FIG. 1.

FIG. 3 illustrates a modified portion of the system of FIG. 1 and uses single lines to represent single wires (instead of single lines to represent two-wire circuits, as was the case in FIG. 1). In the latter system, the amplifier 48 is connected in tandem in the unidirectional signal path and, hence, is arranged to have a normal input impedance, e.g., about 900 ohms, according to standard telephone practice. In FIG. 3, however, an amplifier 48' is arranged to have a high input impedance, e.g., about an order of magnitude larger than that of amplifier 48, and has its input connected across the bidirectional circuit 43 that couples the dispatch station 39 signals to one port of the conference bridge 46. The output of amplifier 48' is coupled to the two-wire circuit node 49 as before. In this arrangement, the output of amplifier 48' includes signal variations corresponding to all of those on the circuit 43, regardless of whether those variations represent outgoing dispatcher signals to the fleet by way of amplifier 48' and to the conference bridge 46, or incoming fleet mobile unit signals from responding fleet units by way of the conference bridge 46 to the dispatcher. Thus, amplifier 48' couples signals propagating in either direction on circuit 43 to the fleet and without disturbing the character of such signals on circuit 43.

Figure 4:
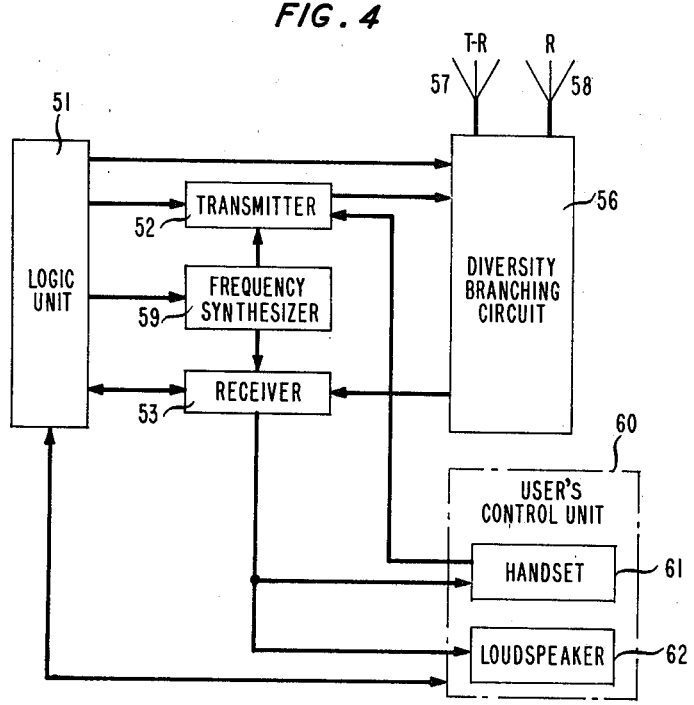
FIG. 4 is a block and line diagram of a known mobile station useful in the system of FIG. 1.

FIG. 4 is a simplified block and line diagram of a mobile radiotelephone unit which is useful in the system of FIG. 1. That diagram is a simplified version, for the purposes of the present description, of the mobile transceiver depicted in FIG. 4 on page 128, and in part, in FIG. 9 on page 138 of the aforementioned BSTJ. However, for purposes of the dispatch fleet calling arrangement described herein, the software residing in a logic unit 51 in FIG. 4 is modified somewhat, as will be hereinafter described. Such modifications could also be implemented by special purpose logic circuits or by a combination of circuits and software as is well known in the art. Logic unit 51 provides logic interface arrangements with other elements of the mobile unit transceiver. A transmitter 52 and a receiver 53 are coupled through a diversity branching circuit 56 to a pair of antennas 57 and 58. The antenna 57 provides signal propagation for electrical signals from the transmitter 52. Either one or the other of the antennas 57 and 58 is used at any given moment for electromagnetic signal reception as determined by signals coupled from the receiver 53 to provide received signal strength indication to the logic unit 51. Any time that received signal strength falls below a predetermined threshold, the logic unit operates the diversity branching circuit 56 to switch to the other one of the two antennas.

In addition to voice signals transmitted and received by the FIG. 4 transceiver, data signals are also transmitted and received. The data signal transmission may take place on a set-up channel to which the transceiver is tuned, or it may take place in a blank-and-burst mode as previously described on a voice channel to which the transceiver is tuned. Received data messages are coupled through the receiver 53 to the logic unit 51, and the information contained therein is utilized to control different parts of the transceiver. For example, tuning commands received from the MTSO are utilized to control a frequency synthesizer 59 which, in turn, determines the operating frequencies of the transmitter 52 and the receiver 53 for any particular channel setting. In addition, the logic unit provides signals to transmitter 52 and receiver 53 to turn either or both of them on or off in accordance with the requirements for mobile unit operation in the system of FIG. 1 as already described. The logic unit 51 is also coupled to a mobile unit user's control unit 60 which includes, for example, the usual telephone handset 61 and a loudspeaker 62. This bidirectional coupling between the control unit 60 and the logic unit 51 provides the interface communication between the user and the control of the transceiver to advise the logic unit 51 of the states of various keys and switches in the control unit 60, and to allow the lighting of special indicator lights on the control unit for various purposes, as well as providing the user with audible alerting signals in lieu of ringing and additional audible tone signal configurations to apprise the user of different functions taking place in the mobile unit.

FIG. 5 is a simplified process flow diagram for the mobile unit of FIG. 4. Although the greatest portion of the indicated process represents technology now known in the art, certain variations, to be described, in the illustrated process or in particular portions thereof are implemented for the purpose of mobile unit cooperation in the dispatch fleet calling system described in connection with FIGS. 1 and 2. When a user initially turns on operating power for the mobile unit, it becomes a working unit; and a number of first level functions takes place such as placing the transmitter in the carrier-off condition, clearing from the logic unit any previously stored dialed digits, and setting the mobile unit call state to the inactive state.

Next, an initialization task takes place, during which the mobile unit scans the system set-up channels to enable it to select the strongest one thereof. The mobile unit then tunes its receiver to the selected set-up channel and acquires bit and word synchronization to enable it to demodulate any received data messages. During the initialization step of the process, and during most of the other steps, any of a plurality of separate functions may be initiated in the nature of interruptions in the operation of the logic unit in the performance of the functions indicated in FIG. 5. Some of these additional functions include data transmission and reception, diversity circuit control, user control unit interface, various time-out functions, and voice channel supervision.

Upon completion of the initialization task, the process enters an idle task, wherein the logic unit compares received mobile unit addresses to determine whether or not the unit is being paged, detects user requests for origination of a call, via the control unit interface, detects orders directing certain mobile unit actions, and detects loss of data measage word synchronization. In addition, either periodically or in response to a received command, the process returns to the initialization step to rescan the set-up channels. This latter looping of the process continues in the absence of further activity in the form of a user action or a detected data message which will cause the process to enter an origination sequence or a page-response sequence or an order-response sequence.

Upon entering the origination sequence, the mobile unit again scans all set-up channels, selects one for monitoring, acquires data message bit and word synchronization, detects and decodes a digital color code identifying the frequency of a supervisory audible tone utilized in the cell employing the selected set-up channel, seizes the reverse set-up channel for communication from the mobile unit to the cell base station, generates a service request data message and transmits it on that reverse set-up channel, and receives and acts upon a responsive data message providing a voice channel designation or another mobile unit order. In this origination sequence, as in both of the other sequences to be described, certain times are allotted for the completion of predetermined parts of the sequence to prevent the mobile unit operation from improperly locking up at any given point in its process. When these functions time-out without proper completion of the predetermined steps, the mobile unit process loops back to the initialization step. It is to this origination sequence that the process of a mobile unit tuned to a fleet-listen channel transfers in response to a switch-hook flash by a user seeking to respond to a fleet-call message. The flash activates the control unit interface function, which informs the logic unit, which in turn retunes the transceiver to the cell set-up channel. A service request message is generated and causes the MTSO to set up a duplex radio channel for coupling the mobile unit to the cell site and from there to the conference bridge 46 in the MTSO.

The page-response sequence is, in most respects, essentially the same as the aforementioned origination sequence. The case of a fleet page-response in the dispatch fleet-calling system differs in that the mobile unit seeks assignment to a listen-only fleet-call channel. Such assignment causes the mobile unit to actuate the frequency synthesizer 59 to retune the unit to a specified fleet-listen channel and also to disable the transmitter 52 as long as the unit is tuned to that channel. Also, in the dispatch system, the mobile unit provides not confirmation to the MTSO that it has, in fact, retuned to the fleet-listen channel.

In the order-response sequence, the mobile unit performs any of the functions already mentioned for the origination and page response sequences. Thus, the unit scans the set-up channels, acquires bit and word synchronization, decodes the digital color code, and seizes the reverse set-up channel. However, at that point in the order-response sequence, a message identifying the received order is returned to the cell site to confirm order receipt; and the process loops back to the initialization step.

Following completion of the aforementioned page-response sequence, and after the mobile unit has retuned to the assigned voice channel (the fleet-listen channel in the case of the dispatch fleet calling arrangement), the process enters an alerting task in which the mobile unit generates appropriate audible signals to alert the mobile unit user to an incoming call and, in nondispatch service, awaits the user response thereto by appropriate operation of the user's control unit 60. When the mobile unit is working in a fleet calling system, the alerting signal is advantageously of a substantially different audible pattern than alerting signals for normal nondispatch radiotelephone service. Thus, the mobile unit user can direct his attention to any subsequent voice message received by way of the handset 61 or the loudspeaker 62, but he knows that he is unable to provide an immediate voice response to any incoming message without a particular dispatch system type of operation of the mobile unit by him.

Following the alerting step in fleet dispatching service, and without awaiting mobile unit user action with respect to the control unit 60, the mobile unit enters the conversation task. Although a wide variety of logic and control unit tasks may be carried out by the mobile unit during the conversation task, the point of particular interest to the present dispatch system is that the user passively listens to the received voice fleet call. However, if the user decides to respond to the received fleet call and generates a switch-hook flash indicating an off-hook state, the process jumps to the origination sequence during which the MTSO is informed, as previously described, of the need to establish a separate duplex voice transmission path between the responding fleet mobile unit and the conference bridge 46. This action takes place without disturbance of the connections of the various fleet-call channels for all the cells of the system. If the dispatcher goes on-hook while the fleet mobile unit is in the conversation task, a release order will be generated at the MTSO and cause the mobile unit process to drop into the release task.

From the foregoing, it can be seen that the fleet calling portions of the system-call procedure include significant differences from the normal, nondispatch, cellular, telephone procedure. For example, plural mobile units, many of which are likely to be in different cells, are paged in sequence in regard to a single call initiated from a fixed station in the overall telephone system. Also, a plurality of fleet mobile units in a single cell is directed to a common voice channel, i.e., a fleet-listen channel, for a single call. It is also unique to the cellular dispatch system to have a paged mobile unit retune to an assigned voice channel in the listen-only mode and there receive an alerting signal, followed by reception of a voice message, without requiring mobile unit confirmation of reception of the alerting signal. Nondispatch radiotelephone systems do not allow a mobile unit on a voice channel, such as the fleet-listen channel, to go off-hook to initiate a service request to be retuned to a different voice channel. It is further new for the responding fleet unit to be retuned to a duplex voice channel coupled to the fleet dispatcher without the necessity for dialing a special code for the dispatcher, and without the necessity for a ringing signal to complete the connection. It is also different to have a call connection in a cellular system with many listening mobile units but without the utilization of a corresponding plurality of voice channels for that call connection.

There are also differences in the dispatch system described herein with respect to dispatch systems heretofore available in the cellular type of system. That is, such prior cellular dispatch systems lacked the ability to use a channel per cell service region as a common fleet-listen channel for all units of a fleet in that region. In addition, prior cellular dispatch systems lacked the foregoing distinctions of having a mobile unit listening on a voice channel go off-hook to initiate a service request for transfer from one voice channel to another, of achieving connection on the second voice channel without the need for dialing, and of having many listening mobile units without having a corresponding plurality of channels in use.

Although the present invention has been described in connection with particular embodiments thereof, it is to be understood that additional embodiments, applications, and modifications thereof, which will be apparent to those skilled in the art, are included within the spirit and scope of the invention.

We claim:

1. In a cellular mobile radiotelephone communication system having a control office (30) for switchably interconnecting information messages through input/output connections of said control office to and from users of mobile units in different service regions of the system, the system being characterized in that there are provided in the control office a fan-out circuit (48, 49) having an input connection and plural output connections, one such output connection for each of a predetermined plurality of cells of said system, means (43, 46, 47) for coupling the fan-out circuit input connection to receive information message signals from a first input/output connection of the control office, means (32) for coupling the fan-out circuit output connections to apply information message signals to respective connections for providing control office outputs, and means (32), including at least a part (46) of the fan-out circuit input coupling means, for bidirectionally coupling information message signals through at least one additional input/output connection of said control office with said first input/output connection, said bidirectional coupling means including means for also coupling bidirectional coupling means information message signals, being coupled in either direction through said bidirectional coupling means, from said bidirectional coupling means to said fan-out circuit input connection.

2. The radiotelephone system in accordance with claim 1 characterized in that said part of said fan-out circuit input coupling means comprises a conference bridge circuit (46).

3. The radiotelephone system in accordance with claim 2 characterized in that the office includes means (33, FIG. 2), responsive to a service request data message from one of said different regions, for actuating said bidirectional coupling means to connect said additional input/output connection to a port of said conference bridge circuit.

4. The radiotelephone system of claim 1 characterized in that each of said mobile units comprises means (51), responsive to a unit off-hook signal while said mobile unit is tuned to a voice channel ($f_{FC10}$) in a listen-only mode, for retuning such unit to a system set-up channel and automatically sending a service request message.

5. In a cellular mobile radiotelephone communication system having a control office (30) and including mobile units in different service regions of the system, the system being characterized in that there are provided in the control office a fan-out circuit (48, 49) having an input connection and plural output connections, means (43, 46, 47) for coupling the fan-out circuit input connection to receive signals from a first input/output connection of the control office, means (32) for coupling the fan-out circuit output connections to apply signals to respective connections for providing control office outputs, and means (32), including at least a part (46) of the fan-out circuit input coupling means, for bidirectionally coupling at least one additional input/output connection of said control office with said first input/output connection, a call control station (39) is provided for placing calls through said first input/output connection of the control office and by way of radio links to a plurality of mobile radiotelephone transceiver units (11, 12, 21, 22) of a group in a predetermined one or more service regions of said system, the fan-out circuit input and output coupling means includes first means (43, 46, 47, 48, 32) for coupling said station to one of said radio links ($f_{FC10}$, $f_{FC20}$) in each of said predetermined one or more regions, said first coupling means including means (48, 23) for restricting coupling to said radio links to unidirectional communication of message signals thereto, and the bidirectional coupling means includes second means (32) for coupling at least one further radio link ($f_{RSP}$) of at least one of said predetermined regions through a part (43, 46) of said first coupling means for bidirectional communication of signals with said station.

6. The radiotelephone system in accordance with claim 5 characterized in that
said office includes a switch network (44) for the establishment of discrete communication paths between pairs of office input and output connections, and
said network includes means (36, 37) in each of said first and second coupling means for switchably setting the respective coupling means connections at the time of a call.

7. The radiotelephone system in accordance with claim 6 characterized in that
a conference bridge circuit (46) is included in said part of said first coupling means, and
said first coupling means includes
an amplifier (48') having an output thereof coupled through said fan-out circuit to a radio link for each of said predetermined regions,
a circuit (43) for coupling said station to a port of said bridge, and
means for coupling an input of said amplifier in shunt across the last-mentioned coupling circuit.

8. The radiotelephone system in accordance with claim 5 characterized in that
said first coupling means includes
a conference bridge circuit in said part of said fan-out circuit input coupling means,
an amplifier (48) having the output thereof coupled to provide signals to said one of said radio links of each of said predetermined regions, and
a circuit (47) for coupling an input/output port to said conference bridge circuit to an input of said amplifier.

9. In a cellular mobile radiotelephone communication system having a control office (30) and including mobile units in different service regions of the system, the system being characterized in that
there are provided in the control office
a fan-out circuit (48, 49) having an input connection and plural output connections,
means (43, 46, 47,) for coupling the fan-out circuit input connection to receive signals from a first input/output connection to the control office,
means (32) for coupling the fan-out circuit output connections to apply signals to respective connections for providing control office outputs, and
means (32), including at least a part (46) of the fan-out circuit input coupling means, for bidirectionally coupling at least one additional input/output connection of said control office with said first input/output connection,
said system includes means, coupled to said at least one additional input/output connection, for providing a bidirectional communication voice radio channel, and
each of said mobile units further includes
means (51), responsive to a mobile unit off-hook signal while said mobile unit is tuned to a voice channel ($f_{FC10}$) in a listen-only mode, for retuning such unit to a system set-up channel and automatically sending a service request message, and
means (51), responsive to a data message command received after said sending of said service request message and ordering the retuning of such mobile unit to said bidirectional communication voice radio channel, for so tuning such mobile unit to the latter channel.

10. The radiotelephone system in accordance with claim 9 characterized in that each said mobile unit further includes
means (51) automatically operative, after transmission of said service request message and prior to the retuning of said unit to said bidirectional communication voice radio channel, for tuning said mobile unit back to said listen-only voice channel to await reception of said data message command retuning order.

11. In a cellular mobile radiotelephone system serving one or more geographical regions and in which all working mobile units (11, 12, 21, 22) listen for data messages addressed to them on a predetermined set-up channel for a region (10, 20) of the system serving each respective mobile unit, the method for communicating between a user of a mobile unit fleet control station and users of a fleet of mobile units included in said working mobile units, said method being characterized in that it comprises the steps of
paging at least part of said fleet mobile units by a data message of said system set-up channel and initiated from said control station,
directing all fleet mobile units in each of said one or more regions responding to the paging to retune to a fleet-listen channel ($f_{FC10}$, $f_{FC20}$) for that region,
relaying a fleet-call message from the control station simultaneously to users of the fleet mobile units tuned to the fleet-listen channels,
recognizing service request data message responses, to a fleet-call, from fleet mobile units on the respective system set-up channels, and directing, by data message, such responding mobile units to retune to respective bidirectional radiotelephone voice call channels ($f_{RSP}$) in a conference connection with the fleet control station, and
coupling all communications in said conference connection to the respective region fleet-listen channels.

* * * * *

UNITED STATES PATENT AND TRADEMARK OFFICE
CERTIFICATE OF CORRECTION

PATENT NO. : 4,399,555
DATED : August 16, 1983
INVENTOR(S) : Verne H. MacDonald, Philip T. Porter and W. Rae Young It is certified that error appears in the above—identified patent and that said Letters Patent is hereby corrected as shown below:

In the Specification, column 1, line 26, "in" should read --to--. Column 3, line 63, "MTSC" should read --MTSO--; line 65, "whch" should read --which--. Column 4, line 13, "or" should read --for--; line 65, "vol." should read --Vol.--. Column 6, line 2, "calls" should read --cells--. Column 8, line 29, "logic" should read --logical--. Column 10, line 19, "not" should read --no--. Column 13, line 33, "to" should read --of--. Column 14, line 38, "of" should read --on--.

Signed and Sealed this

Nineteenth Day of March 1985

[SEAL]

Attest:

DONALD J. QUIGG

Attesting Officer

Acting Commissioner of Patents and Trademarks